US005783122A

United States Patent [19]

Sadinski

[11] Patent Number: 5,783,122
[45] Date of Patent: Jul. 21, 1998

[54] VACUUM EXTRUSION APPARATUS AND METHOD

[75] Inventor: Robert L. Sadinski, Tallmadge, Ohio

[73] Assignee: Owens Corning Fiberglas Technology, Inc., Summit, Ill.

[21] Appl. No.: 696,718

[22] Filed: Aug. 14, 1996

[51] Int. Cl.$^6$ ............................................. B29C 44/20
[52] U.S. Cl. ........................... 264/39; 264/51; 264/101; 264/568; 425/4 C; 425/190; 425/192 R; 425/325; 425/388
[58] Field of Search ............................. 264/39, 568, 51, 264/101, DIG. 78, DIG. 67; 425/388, 71, 325, 4 C, 190, 192 R

[56] References Cited

U.S. PATENT DOCUMENTS

| | | |
|---|---|---|
| 1,990,434 | 12/1935 | Kohler . |
| 2,987,768 | 6/1961 | Given . |
| 3,378,887 | 4/1968 | Reib et al. ............... 264/568 |
| 3,558,753 | 1/1971 | Edlin ........................ 264/568 |
| 3,584,108 | 6/1971 | Nelson et al. . |
| 3,704,083 | 11/1972 | Phipps . |
| 3,822,331 | 7/1974 | Cogliano . |
| 4,044,084 | 8/1977 | Phipps . |
| 4,199,310 | 4/1980 | Phipps . |
| 4,211,739 | 7/1980 | Phipps ..................... 264/51 |
| 4,234,529 | 11/1980 | Phipps . |
| 4,247,276 | 1/1981 | Phipps . |
| 4,371,488 | 2/1983 | Phipps et al. ............. 264/51 |
| 4,395,214 | 7/1983 | Phipps et al. ............. 264/51 |
| 4,486,369 | 12/1984 | Schafler et al. . |
| 4,487,731 | 12/1984 | Kobayashi . |
| 4,626,183 | 12/1986 | Shirai et al. ............. 264/46.1 |
| 4,783,291 | 11/1988 | Pagan ........................ 264/51 |
| 5,236,325 | 8/1993 | Groblacher et al. ...... 264/568 |

FOREIGN PATENT DOCUMENTS

| | | |
|---|---|---|
| 0260948A3 | 9/1987 | European Pat. Off. . |
| 0260949A | 9/1987 | European Pat. Off. . |

*Primary Examiner*—Jan H. Silbaugh
*Assistant Examiner*—Mark Eashoo
*Attorney, Agent, or Firm*—C. Michael Gegenheimer; John W. Renner

[57] ABSTRACT

An extruder projects through a bulkhead adapted to form part of a vacuum chamber, and a die is mounted on the end of the extruder within the bulkhead. The extruder projects through a gland seal which is formed in a sleeve surrounding the extruder. The seal includes a plurality of seal rings surrounding the extruder and packed in the sleeve and held in place in a preferred from by a yieldable retainer. A shaper is positioned downstream of the die and is clamped to the upstream end of the die. The shaper is mounted on tracks on a girder extending from the bulkhead clear of its periphery. The apparatus permits congruent axial movement of the extruder, die and shaper with respect to the bulkhead.

23 Claims, 1 Drawing Sheet

VACUUM EXTRUSION APPARATUS AND METHOD

DISCLOSURE

This invention relates generally to vacuum extrusion apparatus and method, and more particularly to certain improvements in continuous vacuum foam extrusion.

BACKGROUND OF THE INVENTION

High quality, low density foam board and billets are produced by Owens Corning of Toledo, Ohio, to make FOAMULAR® or THERMAPINK™ insulation and other products. Such products are produced by a vacuum extrusion process using an inclined barometric leg. The vacuum chamber apparatus is in the form of a large diameter pipe extending on a substantial slope into a pond of water. When the vacuum is drawn in the chamber, water is drawn up into the pipe at least partially to fill the chamber. The upper end of the chamber substantially above the lower end and pond is closed by a movable large bulkhead or plate which seals against the upper end of the pipe or leg. An extrusion die is mounted on the inside of the plate and one or more extruders are mounted on the outside. The die is connected to the extruder through a gel tube which may be heated or cooled. The gel tube passes through a smaller bulkhead sealing against the larger bulkhead. The gel tube extends through a flexible metal bellows. The bellows permits a degree of flexibility, allows for thermal expansion, and seals the vacuum chamber. Examples of apparatus using such bellows may be seen in prior U.S. Pat. Nos. 4,211,739 and 4,247,276.

positioned downstream of the die within the chamber are shaping mechanisms. A belt or roller mechanism is shown in prior U.S. Pat. No. 4,395,214, while a curved segmented roller system in combination with belts is shown in prior U.S. Pat. No. 4,234,529.

In a foam extrudate line, as the extrudate leaves the die, it begins to expand. As it enters the shaping mechanism it exerts a substantial force tending to push the shaping mechanism away from the die. In such prior mechanisms, the shaping mechanisms are secured to and supported by the bulkhead, while the die is supported by the gel tube and subject to thermal axial expansion and contraction, thus sometimes varying the distance between the die and shaper, however slightly.

This creates control parameter problems. All of the control problems are further complicated by the fact that the bulkhead is itself movable, and that atmospheric pressure is the force holding the bulkhead in place against the end of the leg or chamber, with vacuum present.

It would be desirable to have a vacuum extrusion system where the extruder, die and shaping mechanisms were all mounted for unitary axial movement for expansion and contraction, all while projecting through the bulkhead. It would also be desirable to have a system with a fixed bulkhead and with the extruder directly supporting the die, with the extruder projecting and movable through the bulkhead.

SUMMARY OF THE INVENTION

A vacuum extrusion system includes an extruder, the end of which projects through a fixed bulkhead which forms one end of a vacuum chamber. A die is mounted on the end of the extruder within the chamber and is clamped to a shaping mechanism. The extruder end projects through a gland seal or stuffing box in the bulkhead which permits axial movement of the extruder and the die. The shaping mechanism is clamped to the die for axial movement therewith and is supported on a track or girder projecting from the bulkhead. The gland seal at the bulkhead is formed in a sleeve supported by a smaller or mini-bulkhead. A series of seal rings are contained within the sleeve by a retaining ring. In a preferred form, the ring is spring loaded to press the seal rings against each other along the exterior of the end of the extruder. The construction avoids the gel tube and metal bellows of the prior art simplifying the installation, and also allows the extruder, die and shaper to move axially slightly as a unit through the bulkhead. The girder on which the shaper is track mounted clears the interior periphery of the bulkhead so that a telescoping vacuum chamber section may be moved against and sealed to the interior of the bulkhead.

To the accomplishment of the foregoing and related ends, the invention then comprises the features hereinafter fully described and particularly pointed out in the claims, the following description and annexed drawings setting forth in detail certain illustrative embodiments of the invention, these being indicative, however, of but a few of the various ways in which the principles of the invention may be employed.

DETAILED DESCRIPTION OF THE PREFERRED EMBODIMENTS

Figure 1:
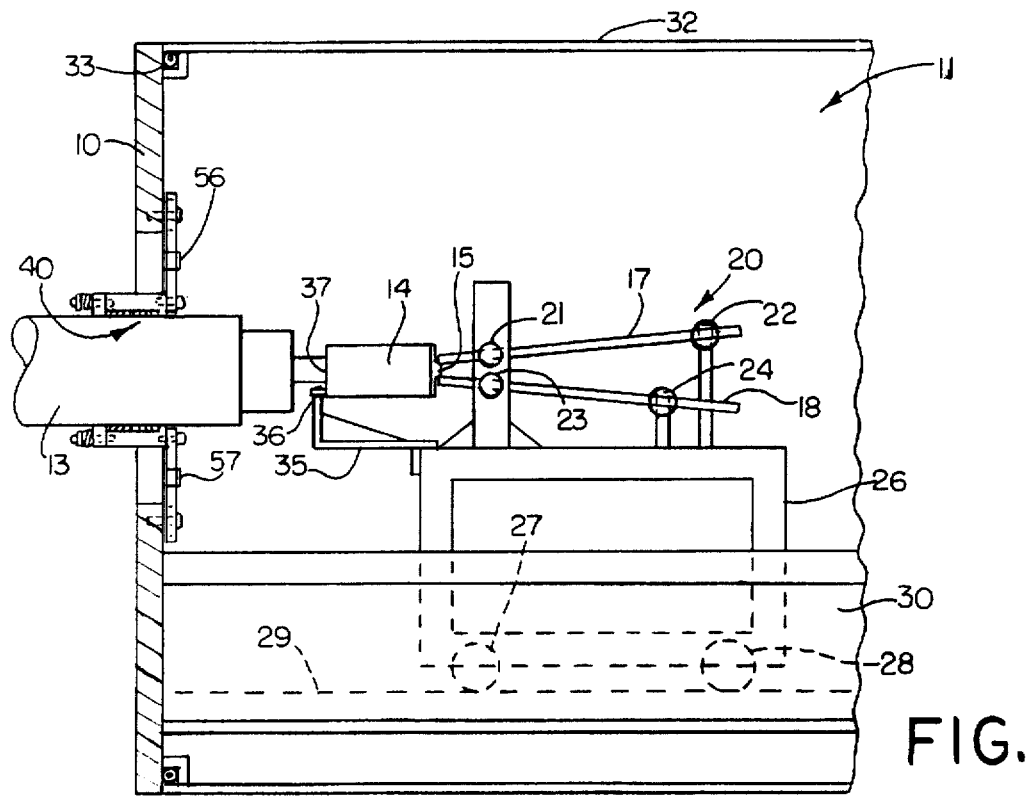
FIG. 1 is a schematic section of an extrusion system in accordance with the present invention at the bulkhead illustrating the extruder, bulkhead, die and shaper, together with a portion of the girder on which the shaper is track mounted.

Referring now to the drawings and more particularly to FIG. 1 there is illustrated a fixed bulkhead shown generally at 10 which forms an end of a vacuum chamber shown generally at 11. An extruder, the end of which is indicated at 13, is positioned on the exterior of the bulkhead and projects through the bulkhead into the interior and supports the die 14 on the projecting end thereof. The die includes die lips or a die opening 15 on the down stream end of the die. Reference may be had to U.S. Pat. Nos. 3,871,812, 4,201,534 or 4,364,722 for examples of the types of dies which may be employed.

Downstream of the die lips the extruder enters the nip between angularly adjustable shaping plates 17 and 18 of a shaper shown generally at 20. The upper plate 17 is adjustable on vertically moveable pivots 21 and 22, while the lower plate 18 is adjustable on vertically moveable pivots 23 and 24. The pivots are mounted on the stanchins illustrated for such vertical adjustment, and accordingly the plates may be adjusted both as to vertical spacing and as to angular position.

The shaper includes a carriage 26 which includes paired wheels shown at 27 and 28 mounted on track 29 which is part of the girder 30 projecting from the bulkhead 10. The girder is secured to and positioned to clear of the periphery of the bulkhead 10 so that a hood indicated at 32 may be telescoped around the girder and what it is supporting to be sealed against the bulkhead as indicated at 33. Reference may be had to the copending application of Roger Lightle, et al. entitled Vacuum Extrusion System and Method, filed Aug. 14, 1996, Ser. No. 08/696,4 for more details of the vacuum chamber and its construction. The vacuum chamber is utilized when high quality low density foams are produced.

As can be seen in FIG. 1 the shaper 20 includes a bracket shown generally at 35 which includes a clamp 36 bearing against the upstream end 37 of the die. As the extrudate exits the die lips or opening 15, it will tend to push the shaper to the right as seen in FIG. 1 away from the die 14. It is accordingly restrained from such movement by the clamp 36. The force tending to separate the shaper and die is more acute when the extrudate is foaming. The shaper in the construction illustrated is accordingly trapped by the die and is constrained for congruent movement therewith.

The extruder 13 may include a barrel and a projecting homogenizer or static mixer and is subject to axial expansion and contraction, and since the die is mounted on the extruder, the die is also subject to such axial movement.

Figure 2:
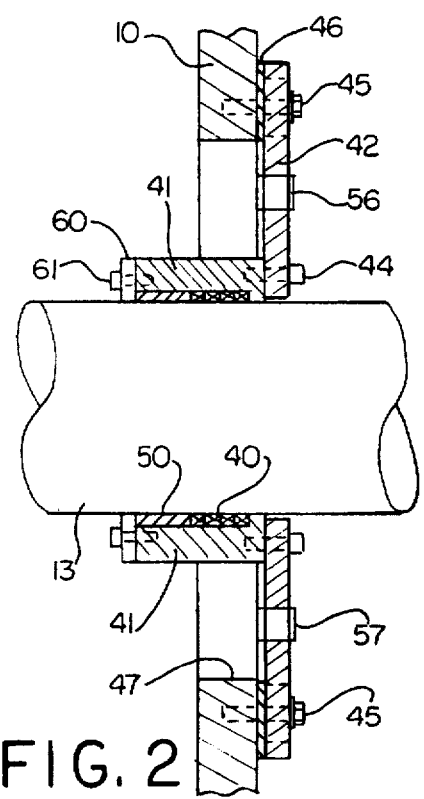
FIG. 2 is a sectional illustration of the extruder at the bulkhead showing one form of gland seal.
Figure 3:
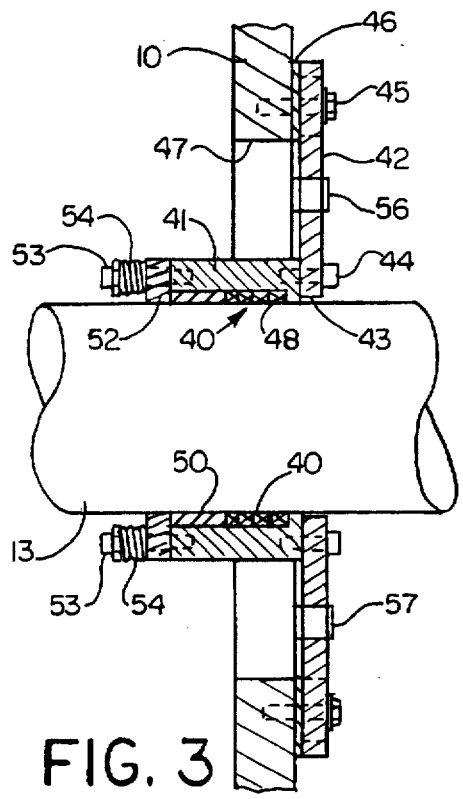
FIG. 3 is a similar illustration showing a slightly modified preferred form of gland seal.

To accommodate such axial movement through the fixed bulkhead 10, there is provided a gland seal shown generally at 40. The preferred form of seal is somewhat enlarged in FIG. 3, and another form of seal is shown in FIG. 2. Referring now additionally to FIG. 3, it will be seen at the seal 40 is mounted in a sleeve 41 which projects axially from a mini-bulkhead 42 at the interior opening 43 thereof. The sleeve may be held to the mini-bulkhead by fasteners 44. The minibulkhead is in turn adjustably secured to main bulkhead by fasteners 45, and a gasket may be employed as indicated at 46. The mini-bulkhead is secured around the somewhat larger part 47 in the main bulkhead. The sleeve 41 includes an interior shoulder 48 which clears the extruder 1 3. In the illustrated embodiment there are four seal rings shown generally at 48 stacked side-by-side, each embracing the extruder. A compression sleeve 50 is also inserted in the sleeve which projects just proud of the end of the sleeve 41 to bear against retaining ring 52. Shoulder bolts 53 secure the ring to the end of the sleeve. Compression springs 54 surrounding the shoulder bolts act upon the retaining ring which in turn acts upon the compression sleeve which then in turn axially compresses the seal pack 40.

The packing glands may be formed of strips of a fluoroelastomer such as VITON® available from E. I. Dupont of Wilmington, Del. The mini-bulkhead may be provided with couplings or fittings illustrated at 56 and 57.

The embodiment of FIG. 2 is similar to FIG. 3 in all respects except the somewhat smaller retaining ring shown generally at 60 is fastened directly to the end of the sleeve by the fasteners 61. There is no shoulder bolt and compression spring urging the compression sleeve 50 against the seal pack.

In the apparatus illustrated, the extruder 13 is fixed to the machine base, and there is no traverse of the extruder in the direction of the process flow or to the right as seen in FIG. 1. The relationship of the die to the forming plates is a fixed position. The forming plates are permitted to move along the girder as illustrated. The die, however, actually pulls and pushes the forming plates during thermal expansion. The packing gland or expansion sleeve through the main bulkhead provides a means to maintain a vacuum seal around the extruder as it passes through the bulkhead and allows the maintenance of such vacuum seal during thermal expansion and any resultant axial or machine axis movement.

To the accomplishment of the foregoing and related ends, the invention then comprises the features hereinafter fully described and particularly pointed out in the claims, the following description and the annexed drawings setting forth in detail certain illustrative embodiments of the invention, these being indicative, however, of but a few of the various ways in which the principles of the invention may be employed.

I claim:

1. A vacuum extrusion apparatus comprising; a vacuum chamber, a bulkhead forming part of said vacuum chamber; an extruder; an extrusion die on an end of said extruder, said extruder projecting through said bulkhead so that said extrusion die is inside said vacuum chamber; an extrudate shaper downstream of said extrusion die; support means supporting said extrudate shaper for movement in said vacuum chamber; means clamping said support means to said extrusion die; and seal means embracing said extruder in said bulkhead permitting axial unitary movement of said extruder, extrusion die, and extrudate shaper with respect to said bulkhead.

2. Apparatus as set forth in claim 1 wherein said support means includes a track and a girder supporting said track clear of a the periphery of the bulkhead.

3. Apparatus as set forth in claim 2 wherein said extrudate shaper includes a movable carriage mounted on said track, and said extrudate shaper is clamped behind an upstream end of the extrusion die to keep the extrudate shaper from moving downstream due to extrudate pressure and yet to move unitarily with the extruder and extrusion die.

4. Apparatus as set forth in claim 3 wherein said seal means is mounted in a mini-bulkhead adjustably supported on said bulkhead.

5. Apparatus as set forth in claim 4 wherein said seal means is mounted in a sleeve extending from said mini-bulkhead and surrounding said extruder.

6. Apparatus as set forth in claim 5 including a plurality of gland seals in said sleeve embracing the extruder and clamped in said sleeve.

7. Apparatus as set forth in claim 6 including a fixed ring retaining said seals.

8. Apparatus as set forth in claim 6 including a spring loaded ring retaining said seals.

9. Apparatus as set forth in claim 6 wherein said gland seals are fluoroelastomer rings.

10. Apparatus as set forth in claim 1 wherein said seal means is mounted on a sleeve extending from said bulkhead and surrounding said extruder.

11. Apparatus as set forth in claim 10 including a plurality of gland seals in said sleeve embracing the extruder and clamped in said sleeve.

12. Apparatus as set forth in claim 11 including a fixed ring retaining said seals.

13. Apparatus as set forth in claim 11 including a spring loaded ring retaining said seals.

14. Apparatus as set forth in claim 13 wherein said gland seals are fluoroelastomer rings.

15. In a method of extrusion and shaping an extrudate in a vacuum chamber, the steps comprising: inserting an extruder through a bulkhead forming part of said vacuum chamber; mounting an extrusion die on the extruder within said vacuum chamber; providing an extrudate shaper downstream of said extrusion die; providing support means supporting the extrudate shaper for movement in said vacuum chamber; providing means clamping the support means to the extrusion die; and a gland seal between the extruder and bulkhead to permit the extruder; extrusion die, and extrudate shaper to move unitarily with respect to the bulkhead.

16. A method as set forth in claim 15 wherein the extrusion is of a foamable extrudate which exerts a downstream pressure tending to separate the extrudate shaper and extrusion die, and clamping the support means behind the upstream end of the extrusion die.

17. A method as set forth in claim 16 including a step of mounting the extrudate shaper for movement on a girder extending downstream of the bulkhead clear of a periphery thereof.

18. A method as set forth in claim 17 including a step of forming the gland seal within an adjustable sleeve extending axially of the bulkhead.

19. A method as set forth in claim 18 including a step of providing a plurality of gland seals embracing the extruder and axially retained in said sleeve.

20. A method as set forth in claim 19 including a step of yieldably retaining said gland seals in said sleeve.

21. A method as set forth in claim 15 including a step of forming the gland seal within an adjustable sleeve extending axially of the bulkhead.

22. A method as set forth in claim 21 including a step of providing a plurality of gland seals embracing the extruder and axially retained in said sleeve.

23. A method as set forth in claim 22 including a step of yieldably retaining said gland seals in said sleeve.

* * * * *